Patented June 10, 1952

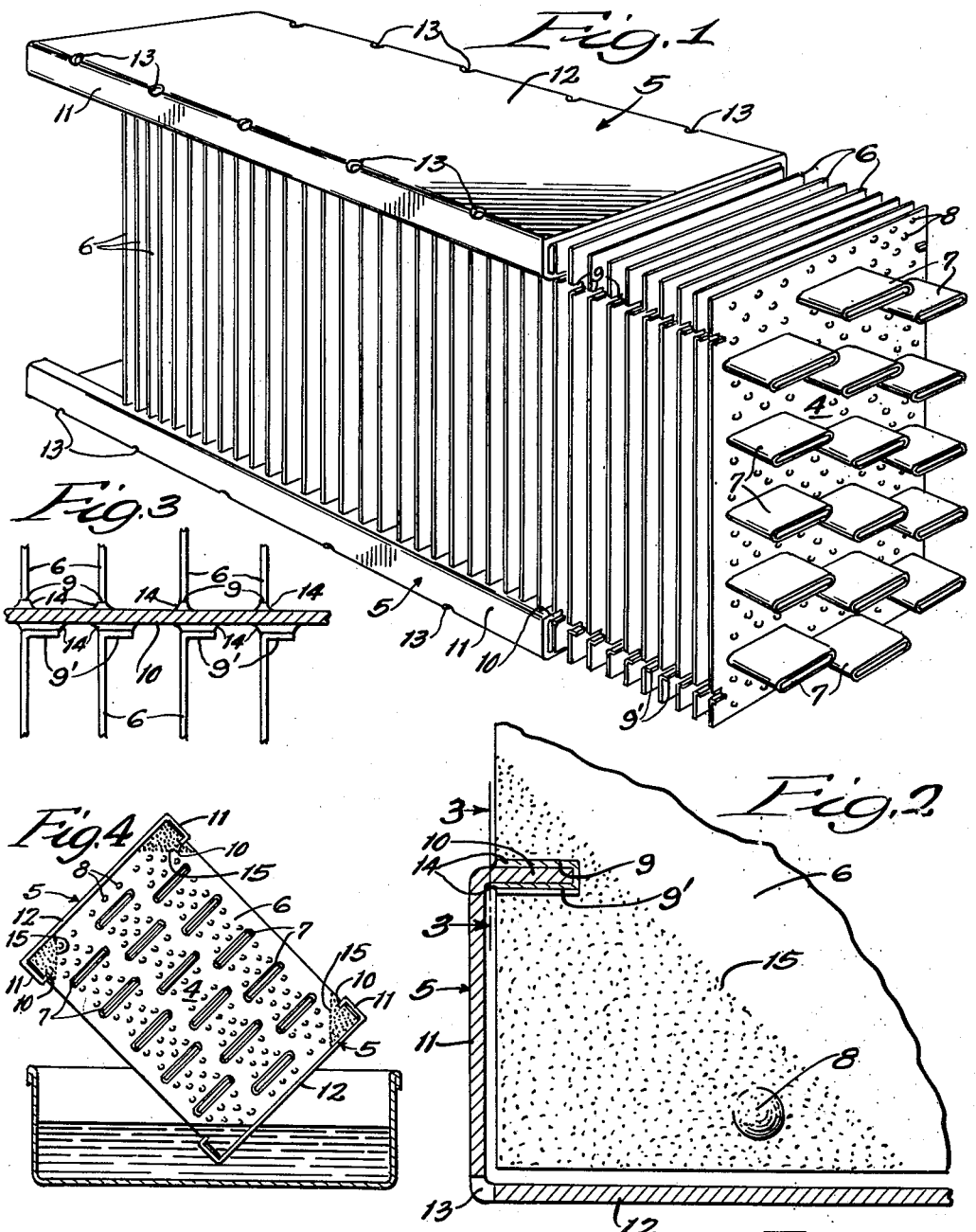

2,599,965

UNITED STATES PATENT OFFICE 2,599,965

HEAT EXCHANGE UNIT

Fred M. Young, Racine, Wis., assignor to Young Radiator, Racine, Wis., a corporation of Wisconsin Application October 30, 1948, Serial No. 57,474

2 Claims. (Cl. 257—124)

The main objects of this invention are to provide a heat-exchange unit having an improved side plate construction which permits the practice of an improved method of solder bonding the plates along the opposite lateral edges of a battery of parallel fins transversely disposed on a plurality of tubes; to provide an improved side plate construction and method of solder bonding which ensures a uniformly secure anchoring of the fins to the side plates; and to provide an improved side plate construction and method of solder bonding which reduces to a minimum the amount of solder that would otherwise be required to secure an anchoring of the thin fin edges to the plate faces.

In the accompanying drawings,

Fig. 1 is a perspective view of a section of a heat-exchange core embodying this invention, the two side plates being shown in the process of being assembled onto the fins prior to the heat-exchange unit being dipped in the solder bath;

Fig. 2 is an enlarged, fragmentary cross-sectional view of one corner of this improved heat-exchange construction more clearly indicating how the solder effects a bond between the side plate flanges and the recessed fins;

Fig. 3 is an enlarged, fragmentary, sectional, elevational view taken on the line 3—3 of Fig. 2; and, Fig. 4 is a diagrammatic view, of reduced proportions compared to Figs. 1 and 2, indicating the preferred manner of dipping a heat-exchange core of this improved type in a solder bath for effecting the bond between the side plate flanges and the fins.

A heat-exchange unit constructed in accordance with this invention comprises a core section 4 on which side plates 5 are assembled and bonded to form a completed unit.

The core section 4 is a conventional construction involving the assembly of a battery of fins 6 on a predetermined number of tubes 7.

The fins 6 are thin sheet metal, preferably copper, being perforated to provide openings for the insertion of the tubes 7. Between the tube openings the fins are stamped to form circular dimples or embossments 8 which not only serve to strengthen the fin but to create turbulence in the air flow between the fins and thereby facilitate the dissipation of heat from the coolant flowing through the tubes 7. The fins 6 have pairs of slots or recesses 9 formed in the opposite lateral edges to receive flanges 10 on the side plates 5, as will appear more fully hereinafter. The metal cut out from each slot 9 is bent over to provide a ledge 9'.

The tubes 7 are likewise of a conventional flat construction, being of such a length and number that when the appropriate number of fins 6 are assembled thereon a core section 4 of the desired size and capacity is provided.

The side plates 5 are of channel cross-section having the edges of the transverse parts 11 thereof turned inwardly to form the oppositely-disposed flanges 10 which are adapted to fit in the slots 9 of the fins 6. The flanges 10 extend parallel to the main part 12 of the plate 5 at a distance closely approximating but not less than the distance of the slots 9 from what are here shown to be the top and bottom edges of the fins 6, namely, the fin edges which are parallel with the main part 12 of the plates 5. Generally when assembled the side plate flanges 10 will contact the fin ledges 9'. Thus when the assembly is dipped in the solder bath, capillary action will tend to draw a film of solder in between the ledges 9' and the plate flanges 10 as indicated in Fig. 3.

Apertures 13 are formed in the plates 5 in the bends along the lateral edges of the main part 12 of these plates. These apertures are provided to facilitate the entrance of molten solder into and the drainage thereof from the area contiguous to the interfitting side plate flange 10 and the fin slots 9.

The provision of apertures 13 permits the practice of an improved method of effecting the soldering of the fins 7 to the side plates 5. This improved method is to dip the heat-exchange unit cornerwise in the solder bath, as shown in Fig. 3. The dipping need only be sufficient to submerge the corner slightly above the side-plate flange 10. The apertures 13 permit the solder to quickly reach the contacting surfaces of the flanges 10 and fin edges around the slots 9 and form a bond 14 uniting these parts. Where perchance other portions of the fins 6 and plates 5 are contiguous enough to permit it, spots of solder may form additional bonds. However, the bond mainly depended upon is that uniting the fin edges contiguous to the plate flanges 10 as shown in Fig. 2. Obviously, a slight film, as indicated by the stippling 15, will tend to form on the submerged corners of the fins 6.

As the unit is withdrawn from the solder bath the surplus molten solder, not attaching itself to the submerged surfaces, drains out through the apertures before it can have a chance to solidify on and between the inner surfaces of the fins 6 and the side plates 5. In the course of producing quantities of these units a very considerable amount of solder will be conserved.

Variations and modifications in the details of structure and arrangement of the parts may be resorted to within the spirit and coverage of the appended claims.

I claim:

1. A heat-exchange unit comprising, an assemblage of transversely-arranged tubes and fins respectively disposed in substantially parallel relationships, a pair of channel-shaped side-plates each formed from a single piece of metal with the transverse parallel parts spaced apart substantially equal to the width of the fins, the edges of said parts being bent inwardly to form oppositely-disposed flanges substantially parallel with the main body parts of the respective side-plates, said fins have alined cuts formed in the lateral edges inwardly from the respective corners a distance substantially equal to the distance between the opposed faces of the inwardly-disposed flanges and said main body parts, the metal at one side of and adjacent each cut being bent over to form a ledge disposed transversely to the plane of the respective fin and thereby constituting a slot for the reception of one of said flanges, said plates being assembled on said fins with said inwardly-disposed flanges extending into said fin slots to rest on said ledges and bonded to said fins only adjacent the area of the corner including the flanges and ledge.

2. A heat-exchange unit comprising, an assemblage of transversely-arranged tubes and fins respectively disposed in substantially parallel relationships, a pair of channel-shaped side-plates each formed from a single piece of metal with the transverse parallel parts spaced apart substantially equal to the width of the fins, the edges of said parts being bent inwardly to form oppositely-disposed flanges substantially parallel with the main body parts of the respective side plates, said fins have alined cuts formed in the lateral edges inwardly from the respective corners a distance substantially equal to the distance between the opposed faces of the inwardly-disposed flanges and said main body parts, the metal at one side of and adjacent each cut being bent over to form a ledge disposed transversely to the plane of the respective fin and thereby constituting a slot for the reception of one of said flanges, said plates being assembled on said fins with said inwardly-disposed flanges extending into said fin slots to rest on said ledges, said plates being bonded to each of said fins only at the areas of contact of the fin edges and said ledges with said plate flanges, the parallel parts, and the contiguous main body part within a line disposed cornerwise across the fins adjacently inward of the fin slots.

FRED M. YOUNG.

REFERENCES CITED

The following references are of record in the file of this patent:

UNITED STATES PATENTS

| Number | Name | Date |
|---|---|---|
| D. 128,514 | Young | July 29, 1941 |
| 845,304 | Kinnear | Feb. 26, 1907 |
| 1,692,818 | Christoph | Nov. 27, 1928 |
| 2,168,549 | Young | Aug. 8, 1939 |
| 2,200,527 | Young | May 14, 1940 |
| 2,331,634 | Stempel | Oct. 12, 1943 |
| 2,438,767 | Spieth | Mar. 30, 1948 |